(12) United States Patent
Miyao et al.

(10) Patent No.: US 10,211,435 B2
(45) Date of Patent: Feb. 19, 2019

(54) CIRCUIT BOARD STRUCTURE

(71) Applicant: DENSO CORPORATION, Kariya, Aichi-pref. (JP)

(72) Inventors: Masanori Miyao, Kariya (JP); Mitsuteru Suzaki, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 138 days.

(21) Appl. No.: 15/109,937

(22) PCT Filed: Dec. 24, 2014

(86) PCT No.: PCT/JP2014/006412
§ 371 (c)(1),
(2) Date: Jul. 6, 2016

(87) PCT Pub. No.: WO2015/104771
PCT Pub. Date: Jul. 16, 2015

(65) Prior Publication Data
US 2016/0336561 A1    Nov. 17, 2016

(30) Foreign Application Priority Data

Jan. 8, 2014    (JP) .................................. 2014-001626

(51) Int. Cl.
*H01M 2/10*    (2006.01)
*H01M 10/6554*    (2014.01)
(Continued)

(52) U.S. Cl.
CPC ....... *H01M 2/1055* (2013.01); *H01M 10/425* (2013.01); *H01M 10/615* (2015.04);
(Continued)

(58) Field of Classification Search
CPC .. H01M 2/10; H01M 2/1055; H01M 10/6554; H01M 10/643; H01M 10/6571;
(Continued)

(56) References Cited

U.S. PATENT DOCUMENTS 9,651,428 B2*    5/2017    Erhart ...................... G01J 5/028
9,806,385 B2*    10/2017    Lee ...................... H01M 10/613
(Continued)

FOREIGN PATENT DOCUMENTS

JP    H09213459 A    8/1997
JP    2002008604 A    1/2002
(Continued)

OTHER PUBLICATIONS

U.S. Appl. No. 15/109,948, filed Jul. 6, 2016, Miyao.

*Primary Examiner* — Karie O'Neill Apicella
(74) *Attorney, Agent, or Firm* — Harness, Dickey & Pierce, P.L.C.

(57) ABSTRACT

A circuit board structure capable of heating a battery without requiring cost for adoption and replacement of the battery is provided. In the mounting of an auxiliary battery incorporated in an in-vehicle emergency notification device as a standby power supply for a main battery and a heater resistor for heating the auxiliary battery, a heat transfer mechanism for transferring heat generated by the heater resistor to the auxiliary battery is provided on a printed board. Further, the auxiliary battery is detachably fixed on the printed board through the heat transfer mechanism.

9 Claims, 14 Drawing Sheets

(51) Int. Cl.
*H01M 10/643* (2014.01)
*H01M 10/6571* (2014.01)
*H01M 10/625* (2014.01)
*H01M 10/42* (2006.01)
*H01M 10/615* (2014.01)
*H01M 10/48* (2006.01)

(52) U.S. Cl.
CPC ....... *H01M 10/625* (2015.04); *H01M 10/643* (2015.04); *H01M 10/6554* (2015.04); *H01M 10/6571* (2015.04); *H01M 10/486* (2013.01); *H01M 2220/20* (2013.01)

(58) Field of Classification Search
CPC .. H01M 10/625; H01M 10/42; H01M 10/425; H01M 10/615; H01M 10/48
See application file for complete search history.

(56) References Cited

U.S. PATENT DOCUMENTS

| 2002/0090546 A1* | 7/2002 | Mu-Tsai | H01M 2/1022 |
| | | | 429/120 |
| 2005/0074666 A1 | 4/2005 | Kimiya et al. | |
| 2005/0218136 A1 | 10/2005 | Kotani et al. | |
| 2013/0344369 A1 | 12/2013 | Miyakawa et al. | |

FOREIGN PATENT DOCUMENTS

| JP | 2004111370 A | 4/2004 |
| JP | 2005295668 A | 10/2005 |
| JP | 2012204129 A | 10/2012 |
| WO | WO-2013065285 A1 | 5/2013 |

* cited by examiner

CIRCUIT BOARD STRUCTURE

CROSS REFERENCE TO RELATED APPLICATIONS

This application is a U.S. National Phase application under 35 U.S.C. 371 of International Application No. PCT/JP2014/006412 filed on Dec. 24, 2014 and published in Japanese as WO 2015/104771 A1 on Jul. 16, 2015. This application is based on and claims the benefit of priority from Japanese Patent Application No. 2014-001626 filed on Jan. 8, 2014. The entire disclosures of all of the above applications are incorporated herein by reference.

TECHNICAL FIELD

The present disclosure relates to a circuit board structure in which a battery is mounted on a circuit board.

BACKGROUND ART

A battery mounted in a vehicle has an output capability decreased in a low-temperature environment. Accordingly, a configuration for heating the battery using a heater has been proposed. For example, in Patent Literature 1, a comb-shaped electrode is formed on a flexible PET resin substrate, and a resin PTC heating element is applied and formed on the comb-shaped electrode, thus forming a sheet heating element. Further, the sheet heating element is wound around the four sides of a battery mounted in a vehicle, and current is conducted to the comb-shaped electrode, thus heating the battery.

PRIOR ART LITERATURE

Patent Literature

Patent Literature 1: JP H09-213459 A

SUMMARY OF INVENTION

In recent years, there have been cases where an emergency notification device for providing emergency notification at the time of an accident or the like is mounted in the vehicle. In order to be able to execute the notification even if the battery mounted in the vehicle is damaged, the emergency notification device includes a small battery as a standby power supply in the device. Such a battery as the standby power supply also has an output capability decreased in a low-temperature environment. Therefore, it is desirable to adopt a configuration for heating it using a heater.

However, in the case of applying the same configuration as in Patent Literature 1 to the battery incorporated in the emergency notification device, for example, there is a possible configuration for covering the periphery of the battery with the sheet heating element. However, in this case, it is necessary to make an integrated configuration, that is, a module by fixing and packing the sheet heating element to the battery with tape or the like. The module is a custom product, which makes it impossible to adopt a general-purpose battery having a lot of marketplace circulation, and might therefore hinder cost reduction. Further, when the battery is exhausted and replaced, the module including the heating element needs to be replaced, which increases replacement cost.

The present disclosure has been made in view of the above circumstances, and it is an object thereof to provide a circuit board structure capable of heating a battery without requiring cost for adoption and replacement of the battery.

According to a first aspect of the present disclosure, a circuit board structure includes a circuit board having a battery and a heating element thereon, and a heat transfer member that transfers heat generated by the heating element to the battery. Further, the battery is detachably fixed on the circuit board through the heat transfer member. With this configuration, it is possible to conduct the heat generated by the heating element to the battery through the heat transfer member to thereby heat the battery, and to detach the battery from the heat transfer member as necessary for easy replacement.

According to a second aspect of the present disclosure, in the circuit board structure, the heating element is disposed on one surface of the circuit board, and the heat transfer member is disposed on the other surface of the circuit board. Further, the circuit board is formed with a through hole at a position corresponding to a portion where the heating element is disposed and a portion where the heat transfer member is disposed, and the heat is conducted from the heating element to the heat transfer member through the through hole. With this configuration, it is possible to compactly dispose the heating element and the heat transfer member on both surfaces of the circuit board and also excellently maintain heat conduction efficiency by conducting the heat between the heating element and the heat transfer member through the through hole.

According to a third aspect of the present disclosure, in the circuit board structure, the heating element is configured with a chip resistor. Therefore, it is possible to simply adjust a mode to heat the battery by adjusting the size of chip resistor or the number of chip resistors disposed.

According to a fourth aspect of the present disclosure, in the circuit board structure, the heating element is disposed along a longitudinal direction of the battery that has a cylindrical contour. Therefore, it is possible to efficiently heat the battery.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

First Embodiment

Figure 2:
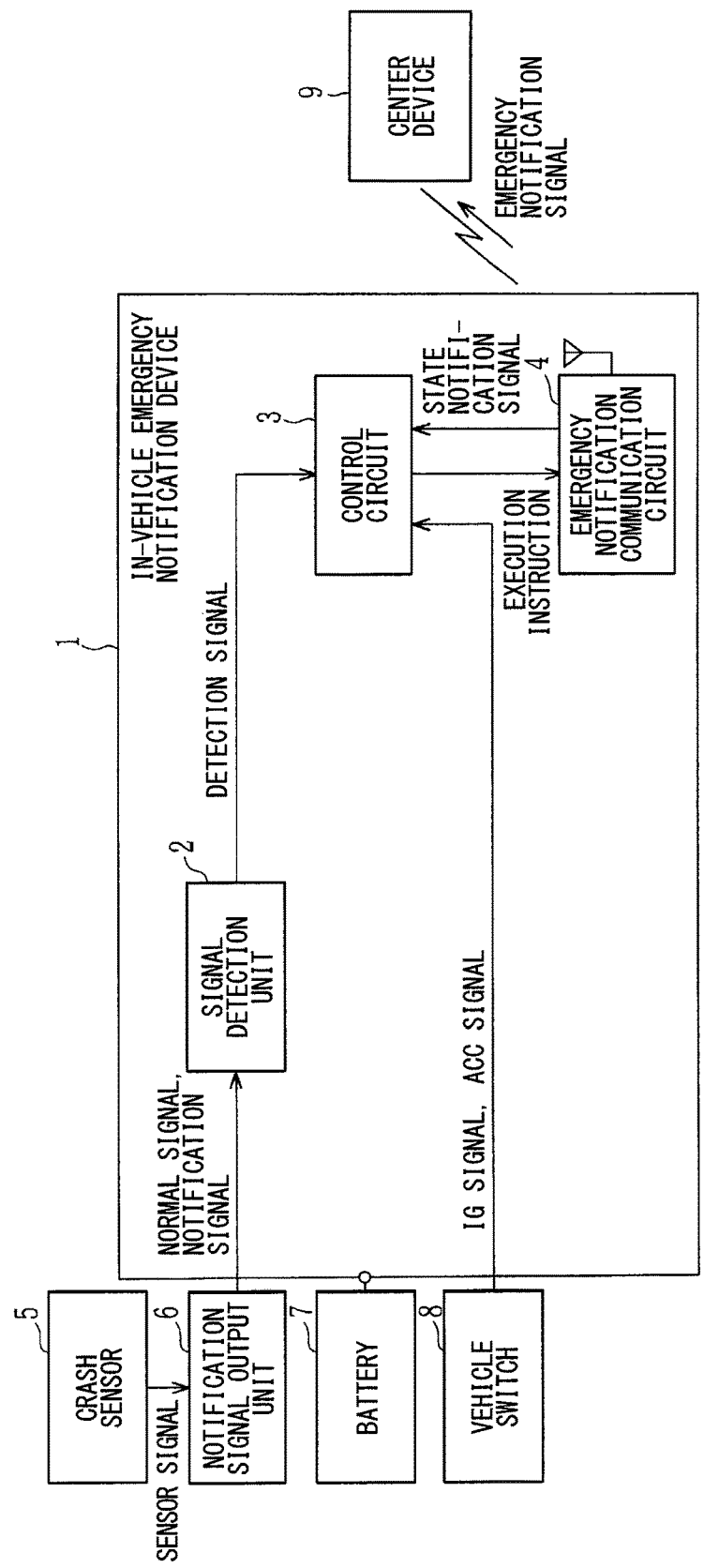
FIG. 2 is a functional block diagram schematically showing the entire configuration of the in-vehicle emergency notification device according to the first embodiment.

As shown in FIG. 2, an in-vehicle emergency notification device 1 (electronic device) is mountable in a vehicle, and includes a signal detection unit 2, a control circuit 3 (control unit), and an emergency notification communication circuit 4. The term "mountable in the vehicle" includes a mode of being fixedly mounted in the vehicle and a mode of being detachably mounted in the vehicle.

A crash sensor 5 is provided at a predetermined location such as a front portion of a vehicle body, and outputs a sensor signal to a notification signal output unit 6 in response to a vehicle crash. The notification signal output unit 6 is, for example, an airbag ECU (Electronic Control Unit), and outputs a normal signal to the signal detection unit 2 by means of a pulse signal during no input of the sensor signal from the crash sensor 5. On the other hand, when the sensor signal is inputted from the crash sensor 5, the notification signal output unit 6 outputs a notification signal different from the normal signal to the signal detection unit 2 by means of a pulse signal, and controls the deployment of an airbag (not shown) to protect a driver and a passenger from a crash impact.

The signal detection unit 2 detects the pulse signal inputted from the notification signal output unit 6, detects the interval (high/low pulse duration) between edges between the high and low levels of the pulse signal, and outputs a detection signal capable of identifying the detection result to the control circuit 3. A main battery 7, which is a battery mounted in the vehicle, supplies operating power to the in-vehicle emergency notification device 1. The configuration of a power supply system in the in-vehicle emergency notification device 1 will be described later with reference to FIG. 1.

The control circuit 3 is configured mainly with a microcomputer composed of a CPU, a ROM, a RAM, and the like, and executes an operating program stored in the ROM to control the overall operation of the in-vehicle emergency notification device 1. The control circuit 3 monitors the input of an IG signal and an ACC signal from a vehicle switch 8 in a low power consumption state when IG (ignition) and ACC (accessory) are in an off state, and determines the input of the IG signal and the ACC signal, thereby determining switching from the off state of IG and ACC to the on state.

When the detection signal is inputted from the signal detection unit 2, the control circuit 3 analyzes the detection signal and thereby determines whether the pulse signal outputted from the notification signal output unit 6 is the notification signal or the normal signal, that is, the vehicle has crashed or not. If the control circuit 3 determines that the pulse signal outputted from the notification signal output unit 6 is the notification signal, that is, the vehicle has crashed, the control circuit 3 outputs an instruction for executing an emergency notification to the emergency notification communication circuit 4.

The emergency notification communication circuit 4 has a telephone function (an outgoing call function of making an outgoing call to a communication network, an incoming call function of receiving an incoming call from the communication network, a voice call function of performing a voice call, a data communication function of performing data communication, and the like), and provides an emergency notification using the telephone function when the instruction for executing the emergency notification is inputted from the control circuit 3. More specifically, the emergency notification communication circuit 4 transmits an emergency notification signal including the current position of the vehicle identified by a current position identification unit (not shown) using e.g. a GPS (Global Positioning System) and vehicle identification information (a vehicle number, the user of the vehicle, etc.) capable of identifying the vehicle and registered beforehand to a center device 9 of an outside agency registered beforehand via a wide area communication network (including a mobile communication network and a fixed communication network), thus providing the emergency notification.

When the center device 9 receives the emergency notification signal transmitted from the in-vehicle emergency notification device 1 via the wide area communication network, the center device 9 informs the occurrence of the emergency notification to an operator or the like of the outside agency. Upon receipt of the rescue request, the operator provides necessary assistance. There are various modes of assistance between the operator and the user (driver). For example, after the in-vehicle emergency notification device 1 makes an outgoing call (call) to the center device 9 to connect a telephone line and the in-vehicle emergency notification device 1 transmits the current position of the vehicle and the vehicle identification information to the center device 9, the telephone line is temporarily disconnected, the center device 9 makes an outgoing call (callback) to the in-vehicle emergency notification device 1 to reconnect the telephone line, and a voice call may be performed. Alternatively, switching from data communication to a voice call may be performed with the telephone line kept connected without disconnection.

When the emergency notification communication circuit 4 starts the emergency notification after the instruction for executing the emergency notification is inputted from the control circuit 3, the emergency notification communication circuit 4 outputs a state notification signal capable of identifying which operating state the emergency notification communication circuit is in, the data communication, the voice call, or standby for an outgoing/incoming call and whether or not the emergency notification has ended to the control circuit 3. That is, the control circuit 3 analyzes the state notification signal inputted from the emergency notification communication circuit 4, and can thereby identify which operating state the emergency notification communication circuit 4 is in, the data communication, the voice call, or standby and whether or not the emergency notification has ended.

The emergency notification communication circuit 4 may autonomously and periodically output the state notification signal to the control circuit 3, or may output the state notification signal to the control circuit 3 in response to periodical input of a state inquiry signal from the control circuit 3. Alternatively, the emergency notification communication circuit 4 may output the state notification signal to the control circuit 3 at the time of switching the operating states.

Figure 1:
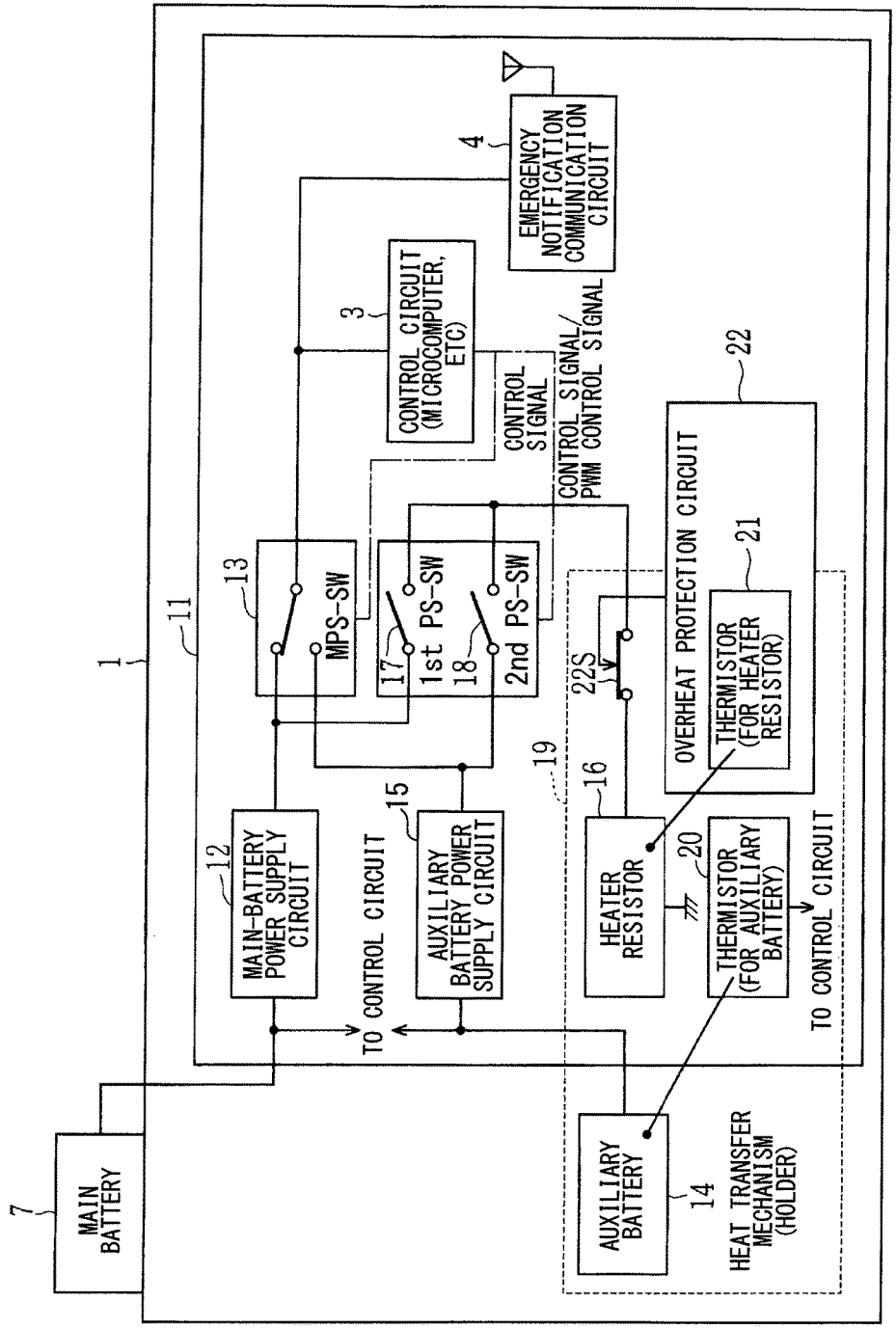
FIG. 1 is a functional block diagram showing a partial configuration of an in-vehicle emergency notification device according to a first embodiment of the present disclosure.

In FIG. 1, components constituting the in-vehicle emergency notification device 1 are mounted on a printed board 11 (circuit board). The power supplied from the main battery 7 is stepped down by a main-battery power supply circuit 12 to a lower voltage, which is supplied through a main power supply switch 13 (MPS-SW) to the control circuit 3 and the emergency notification communication circuit 4. An auxiliary battery 14 (battery) is a backup power supply for the main battery 7. In terms of being incorporated into the in-vehicle emergency notification device 1, it is desirable that the auxiliary battery 14 is miniaturized and a smaller number of cells are preferably used. For example, a lithium-ion battery has a 4[V]×1 cell, a nickel-hydrogen battery has 1.2[V]×3 or 4 cells, and a lithium manganese dioxide battery has a 3[V]×1 cell. In general, the auxiliary battery 14 has a characteristic of increasing an internal resistance in a low-temperature environment of the vehicle or due to deterioration with the lapse of use years, thereby decreasing a power supply voltage. The auxiliary battery 14 is incorporated in the in-vehicle emergency notification device 1 with a structure that enables a worker to replace the auxiliary battery.

An auxiliary-battery power supply circuit 15 is connected to the auxiliary battery 14, and converts (boosts) an auxiliary power supply voltage supplied from the auxiliary battery 14. That is, the auxiliary-battery power supply circuit 15 converts the auxiliary power supply voltage supplied from the auxiliary battery 14 to generate a boosted voltage of 4.8 V, and supplies the generated boosted voltage through the main power supply switch 13 to the control circuit 3, the emergency notification communication circuit 4, and the like. That is, the main power supply switch 13 is a 2-input/1-output multiplexer, and the switching thereof is controlled by the control circuit 3. The voltage of the auxiliary-battery power supply circuit 15 is within the range of the operating voltage (e.g., 3 to 5 V) of each functional block.

A heater resistor 16 (heating element) is disposed near the auxiliary battery 14. Power is supplied to the heater resistor 16 through the main-battery power supply circuit 12 and a first power supply switch 17 (first power supply path formation unit, $1^{st}$ PS-SW) or through the auxiliary-battery power supply circuit 15 and a second power supply switch 18 (second power supply path formation unit, $2^{nd}$ PS-SW). The heater resistor 16 is used to heat the auxiliary battery 14 when the vehicle is in a low-temperature environment or to check the function of the auxiliary battery 14. Heat generated by the heater resistor 16 is transferred through a heat transfer mechanism 19 to the auxiliary battery 14.

Further, a thermistor 20 (temperature detection unit) for temperature detection is disposed near the auxiliary battery 14, and a thermistor 21 for temperature detection is disposed near the heater resistor 16. A sensor signal of the thermistor 20 is inputted to the control circuit 3. The thermistor 21 is incorporated in an overheat protection circuit 22 which operates so as to cut off a power supply path to the heater resistor 16 when the heater resistor 16 is overheated. The overheat protection circuit 22 performs an overheat protection operation by opening a normally closed switch 22S disposed between the first and second power supply switches 17, 18 and the heater resistor 16.

The main power supply switch 13 and the first and second power supply switches 17, 18 are configured with transistors (semiconductor switches) such as MOSFETs. The input terminal of the control circuit 3 is connected to the positive terminals of the main battery 7 and the auxiliary battery 14, and these power supply voltages undergo A/D conversion (after voltage division as necessary) to be read.

Figure 7A:
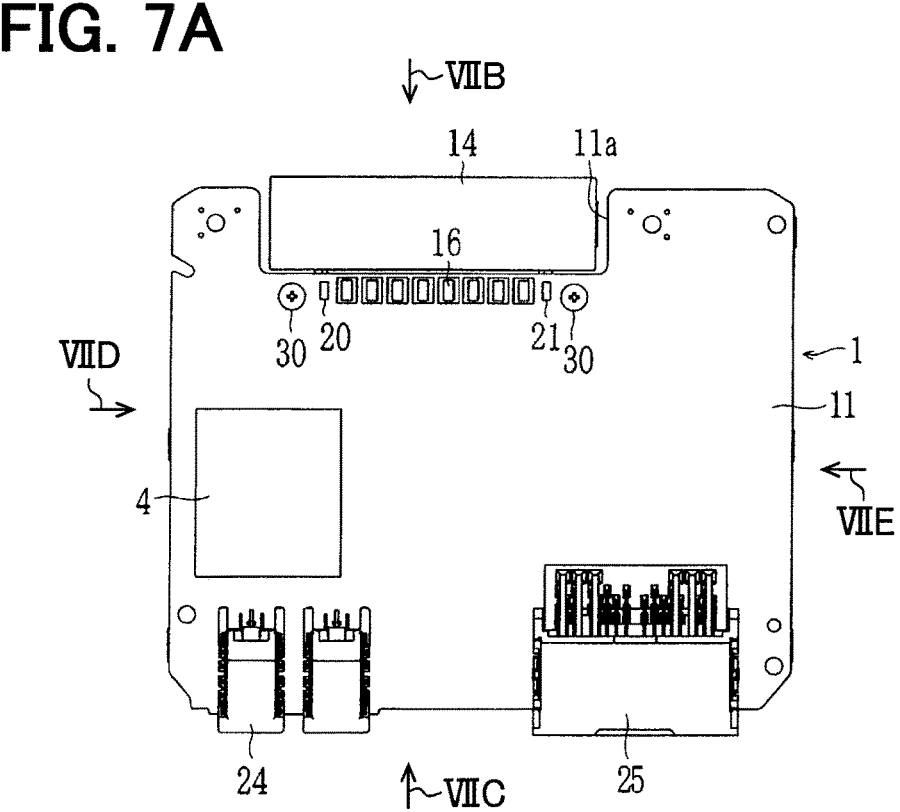
FIG. 7A is a plan view of a printed board for illustrating the state of components, which constitute the in-vehicle emergency notification device, mounted on the printed board.
Figure 7B:
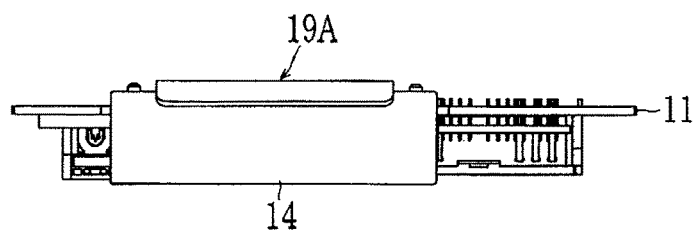
FIG. 7B is a back view of the printed board shown in FIG. 7A as viewed along the direction of an arrow VIIB.
Figure 7C:
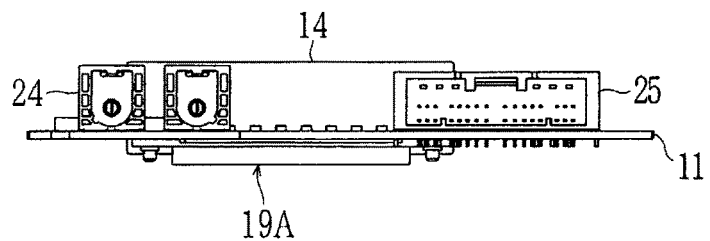
FIG. 7C is a front view of the printed board shown in FIG. 7A as viewed along the direction of an arrow VIIC.
Figure 7D:
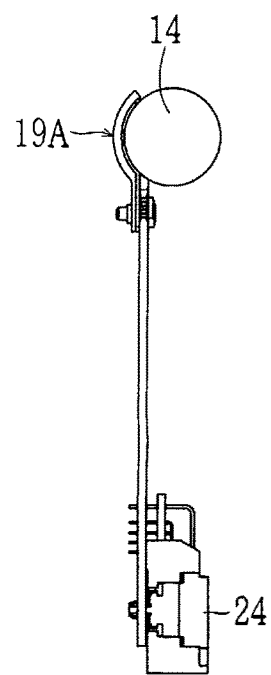
FIG. 7D is a side view of the printed board shown in FIG. 7A as viewed along the direction of an arrow VIID.
Figure 7E:
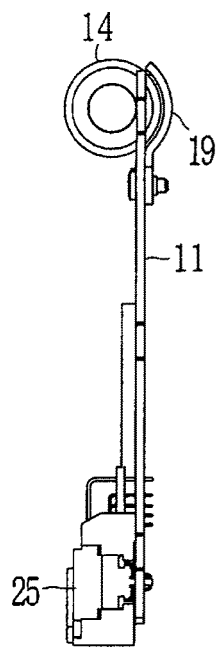
FIG. 7E is a side view of the printed board shown in FIG. 7A as viewed along the direction of an arrow VIIE.

As shown in FIGS. 7A to 7E and FIGS. 8A and 8B, the printed board 11 substantially has a rectangular shape, and a landscape-oriented rectangular cutout 11a is formed at the back (the upper side of FIG. 7A). A battery holder 19A (battery holder) made of metal (e.g., aluminum) constituting the heat transfer mechanism 19 (heat transfer member) is mounted to the cutout 11a. The auxiliary battery 14 is cylindrical, and the battery holder 19A has a holding portion 19Aa having a curved surface along the arc of the auxiliary battery 14 so as to hold a part of the peripheral surface of the cylinder along the longitudinal direction (see FIG. 9). The battery holder 19A has a landscape-oriented rectangular fixing portion 19Ab in continuation with the holding portion 19Aa, the fixing portion 19Ab is in contact with the rear surface of the printed board 11, and both ends of the fixing portion 19Ab are fixed by screws 30 from the front surface of the printed board 11 (see FIGS. 7A, 8B).

Figure 8A:
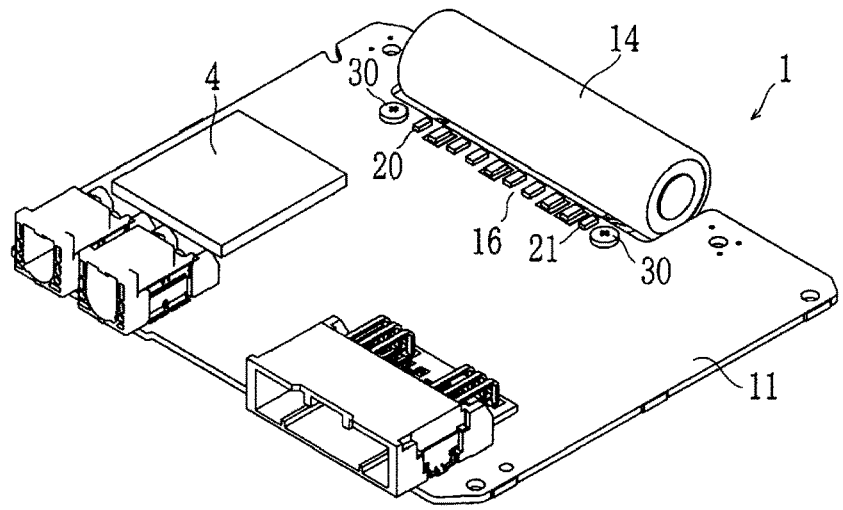
FIG. 8A is a perspective view of the printed board shown in FIG. 7A.
Figure 8B:
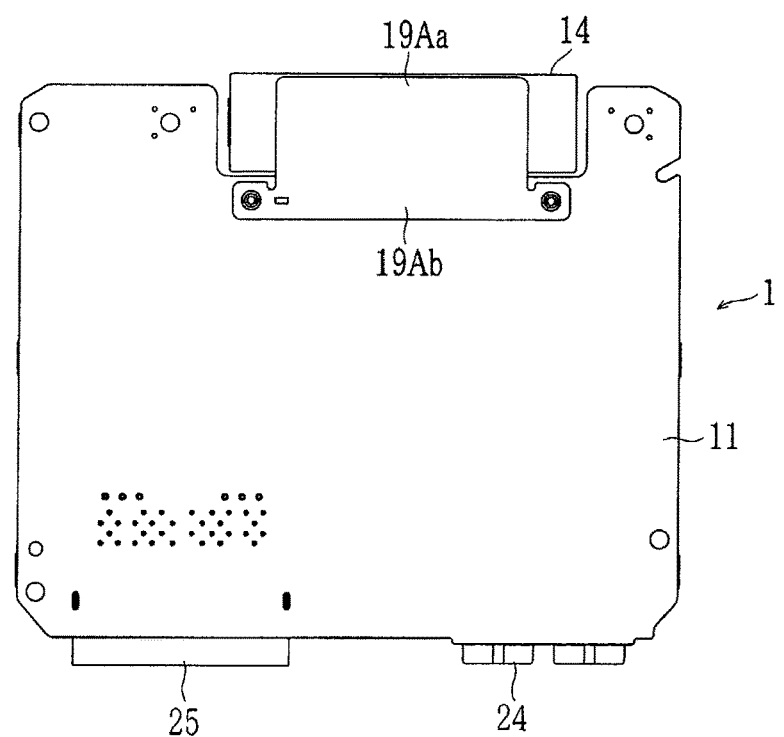
FIG. 8B is a bottom view of the printed board shown in FIG. 7A.
Figure 9:
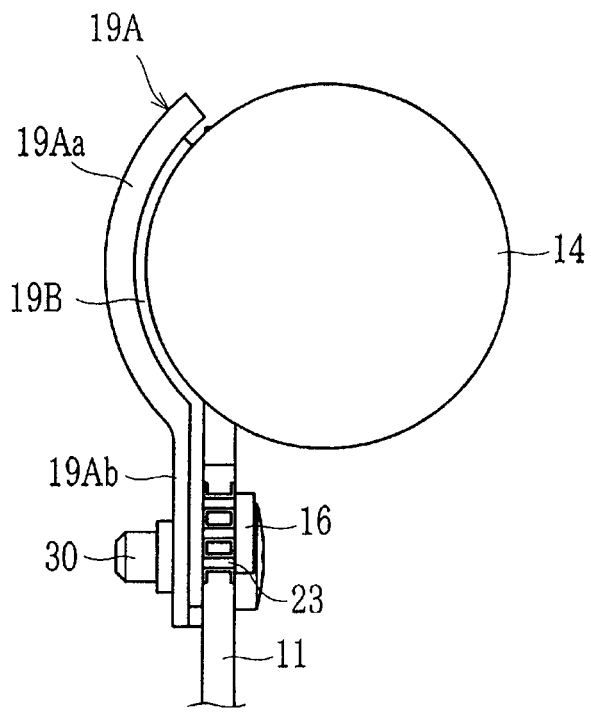
FIG. 9 is a partial enlarged view of the printed board shown in FIG. 7D.

As shown in FIGS. 7A, 8A, a plurality of heater resistors 16 composed of chip resistors are arranged in the longitudinal direction of the cutout 11a on the front surface of the printed board 11 corresponding to the position of the fixing portion 19Ab. As shown in FIG. 9, a heat transfer sheet 19B (heat transfer material) constituting the heat transfer mechanism 19 is interposed between the battery holder 19A and the auxiliary battery 14 and the printed board 11. The heat transfer sheet 19B is, for example, a silicon-based elastic material, and is in close contact with the battery holder 19A, the auxiliary battery 14, and the printed board 11. When the lid of an outer case (not shown) is attached, the auxiliary battery 14 is pressed from the top (in the front view) by the rear surface of the lid, and is held in a state of being pressed against the heat transfer sheet 19B on the battery holder 19A.

As shown in FIG. 9, a through hole 23 made with copper foil is formed between the heater resistor 16 disposed on the front surface of the printed board 11 and the rear surface of the printed board 11, that is, a portion where the fixing portion 19Ab of the battery holder 19A is in contact through the heat transfer sheet 19B. With this, when the heater resistor 16 is energized and heat is generated, the heat is conducted to the rear surface of the printed board 11 through the through hole 23, and further conducted to the heat transfer sheet 19B, the battery holder 19A, and the auxiliary battery 14. In FIG. 9, only the portion showing the through hole 23 is shown in cross section.

As shown in FIGS. 7A, 8A, the thermistors 20, 21 are disposed on both sides of the heater resistor 16, respectively. The thermistors 20, 21 are positioned so as to equally detect the heat generated by the heater resistor 16 and disposed close to the fixing portion 19Ab of the battery holder 19A disposed on the rear surface of the printed board 11. Since the thermistor 20 is provided in order for the control circuit 3 to detect the temperature of the auxiliary battery 14, correlation data between the temperature detected by the thermistor 20 in this position and the actual temperature of the auxiliary battery 14 is obtained beforehand so that the control circuit 3 detects the temperature.

In addition, the module of the emergency notification communication circuit 4, a connector 24 for connecting an antenna to the emergency notification communication circuit 4, an interface connector 25 through which the control circuit 3 communicates with the vehicle, and the like are disposed on the printed board 11.

Figure 3:
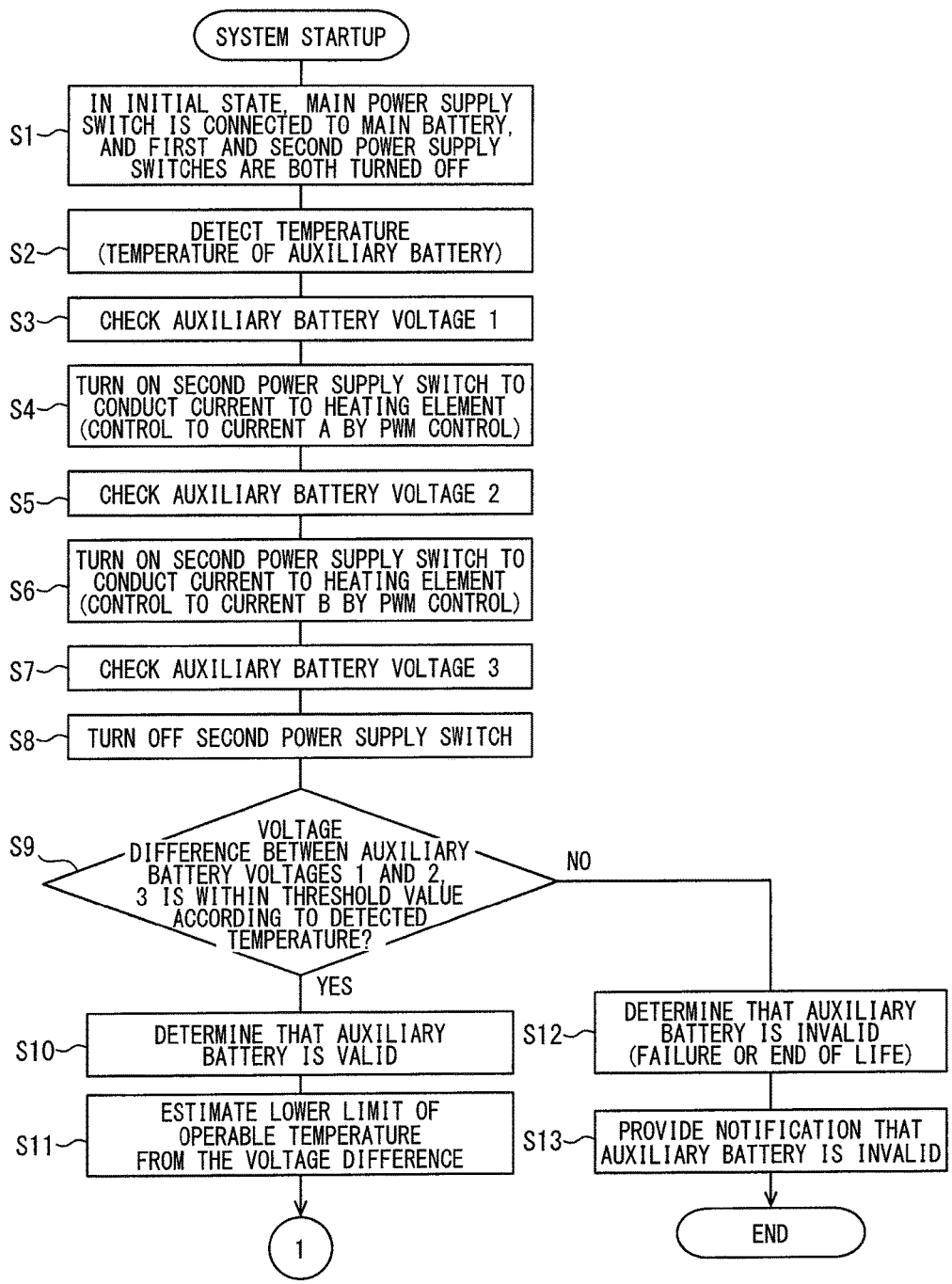
FIG. 3 is a flowchart showing contents of a control.
Figure 4:
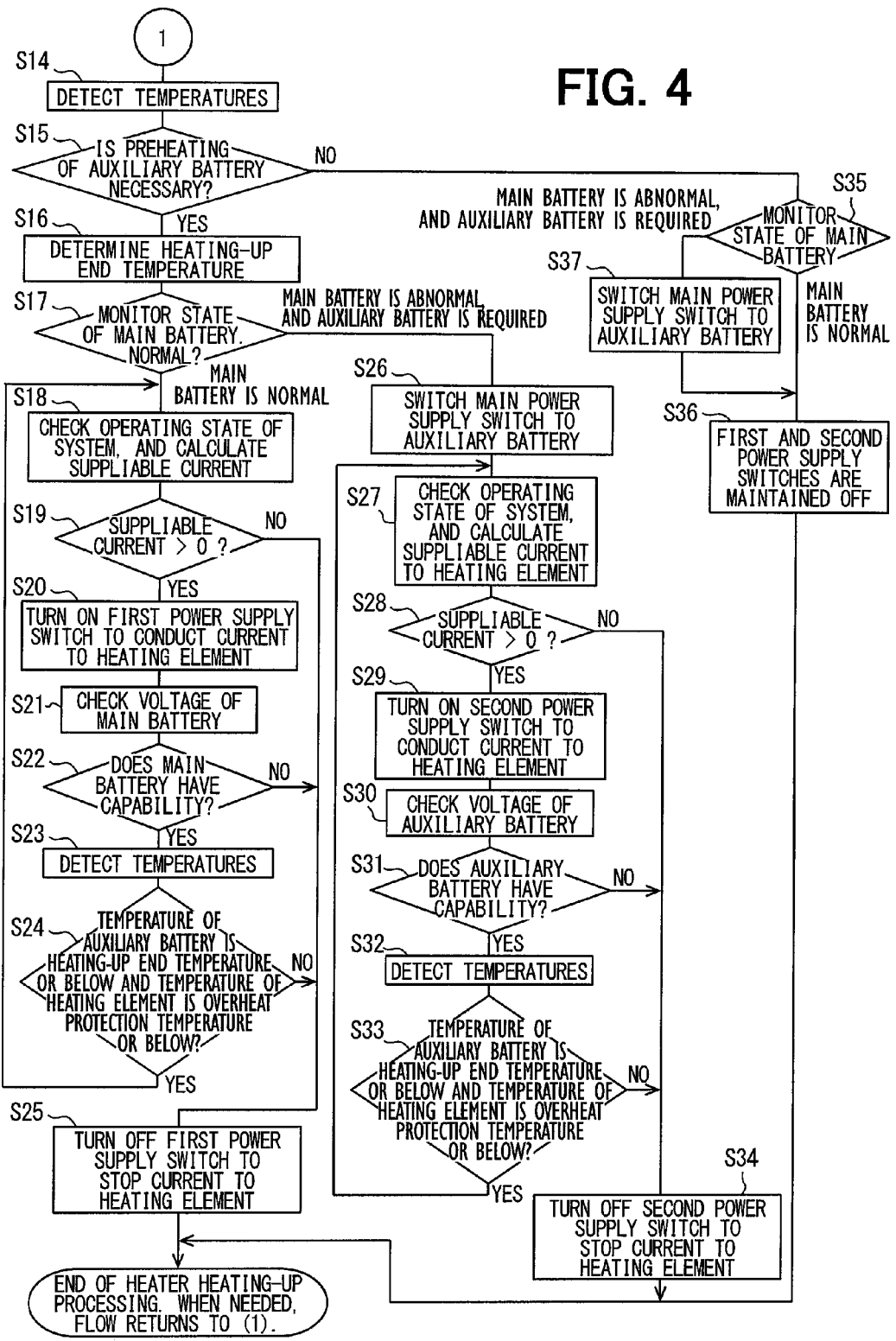
FIG. 4 is a flowchart showing contents of the control following FIG. 3.

Next, the operation of the present embodiment will be described with reference to FIGS. 3 to 5B. In FIG. 3, in an initial state, the main power supply switch 13 is connected to the main battery 7, and the first and second power supply switches 17, 18 are both turned off (S1). The control circuit 3 detects the temperature of the auxiliary battery 14 through the thermistor 20 (S2), and then checks (1) the voltage of the auxiliary battery 14 (S3).

Then, the control circuit 3 performs on/off control of the second power supply switch 18 with a PWM signal so that the current flowing to the heater resistor 16 by the power from the auxiliary battery 14 becomes a current value A (S4). In this state, the control circuit 3 checks (2) the voltage of the auxiliary battery 14 (S5). Then, the control circuit 3 performs on/off control of the second power supply switch 18 with the PWM signal so that the current flowing to the heater resistor 16 becomes a current value B (>A) (S6), and checks (3) the voltage of the auxiliary battery 14 in this state (S7). Then, the second power supply switch 18 is turned off (S8).

Then, the control circuit 3 determines whether or not the difference between the voltages of the auxiliary battery 14 detected in steps S3, S5, S7 is within a threshold value according to the temperature of the auxiliary battery 14 detected in step S2 (S9). If it is within the threshold value (YES), the control circuit 3 determines that the auxiliary battery 14 is valid (function is normal) (S10), and executes step S11 and the subsequent steps. On the other hand, if it is not within the threshold value (NO), the control circuit 3 determines that the auxiliary battery 14 is invalid (failure or end of life) (S12), provides notification that the auxiliary battery 14 is invalid (S13), and ends the processing.

As for the notification, if the in-vehicle emergency notification device 1 has a warning indicator (such as an LED lamp), the indicator is lit for indication. Alternatively, if the in-vehicle emergency notification device 1 is connected to a body ECU (Electronic Control Unit) or the like of the vehicle through an in-vehicle LAN or the like, a message signal may be transmitted to the body ECU and displayed on an instrument panel of the vehicle.

The relationship between the detected temperature of the auxiliary battery 14 and the difference between the detected voltages in step S9 will be described with reference to FIGS. 5A, 5B. The current A shown in FIG. 5A and the current B shown in FIG. 5B have the relationship of (A<B). Determination lines set at the respective current values are based on the temperature characteristics of the auxiliary battery 14. For example, in a low-temperature region below −10° C., the amount of voltage drop increases sharply, which leads to the possibility of not being able to supply enough power.

Figure 5A:
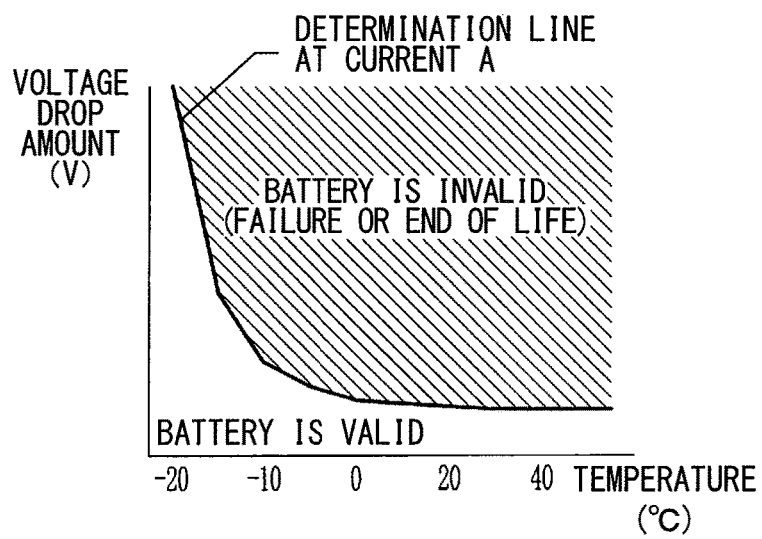
FIG. 5A is a diagram showing the relationship between the temperature and the amount of voltage drop of an auxiliary battery.
Figure 5B:
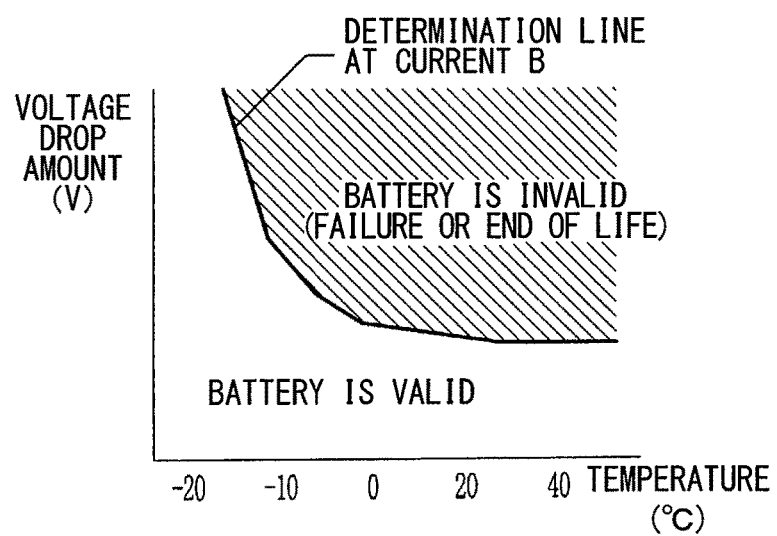
FIG. 5B is a diagram showing the relationship between the temperature and the amount of voltage drop of the auxiliary battery.

At the same temperature, the amount of voltage drop of the auxiliary battery 14 increases with increasing output current; therefore, it is preferable to set different determination lines based on a plurality of current values, as shown in FIGS. 5A, 5B. For example, at low temperatures, even if the output current is small, the amount of voltage drop is large, so that there is no problem with the determination accuracy. However, at normal or high temperatures, the amount of voltage drop is not large unless the output current is large to some extent. Accordingly, in the latter case, the amount of voltage drop at a large output current is used for determination, thus maintaining the determination accuracy. As a matter of course, a determination line may be set at one current value.

Further, in step S9, it is not necessary to perform the on/off control of the second power supply switch 18 with the PWM signal at the time of referring to the amount of voltage change for the abnormality determination of the auxiliary battery 14. For example, the amount of drop of the voltage of the auxiliary battery 14 when the second power supply switch is (continuously) turned on from the voltage of the auxiliary battery 14 when the second power supply switch is turned off may be used for the abnormality determination.

On the other hand, if the auxiliary battery 14 is valid, the lower limit of the operable temperature of the auxiliary battery 14 is estimated from the voltage difference obtained in step S9 (S11). Then, the temperature of the auxiliary battery 14 and the temperature of the heater resistor 16 through the thermistor 21 are detected (S14), and in step S15, it is determined whether or not the preheating of the auxiliary battery 14 is necessary. The determination conditions are as follows:

(temperature of the auxiliary battery 14)≤(operable temperature); and (temperature of the heater resistor 16)≤(overheat protection temperature).

If the conditions are satisfied, it is determined that the preheating of the auxiliary battery 14 is necessary (YES).

Then, the flow moves to step S16, where a heating-up end temperature of the auxiliary battery 14 is determined from the operable temperature estimated in step S11. Then, the voltage of the main battery 7 is checked, and it is determined whether or not the voltage is normal (S17). If it is normal (YES), steps S18 to S25 are executed. If it is abnormal (NO), steps S26 to S34 are executed.

The relationship between the voltage difference and the lower limit of the operable temperature in step S11 and the relationship of the heating-up end temperature in step S16 will be described. Assume that the amount of voltage drop at some measurement is within the valid region of the auxiliary battery 14 as shown by a dot in FIG. 6. However, since the amount of voltage drop exceeds the operating limit of a system shown by a dashed line in FIG. 6, it is not possible to use the auxiliary battery 14 as it is. (In FIG. 6, the "operating limit" is assumed to be constant independently of the temperature. To be precise, the amount of voltage drop corresponding to "the operating limit" changes in accordance with the voltage of the auxiliary battery 14.)

Figure 6:
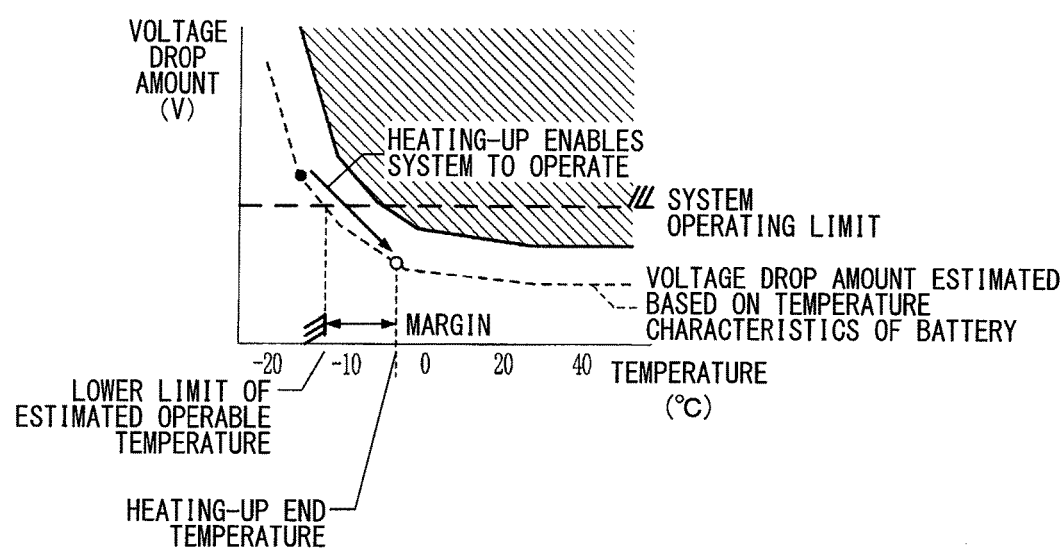
FIG. 6 is a diagram for explaining the relationship between the amount of voltage drop of the auxiliary battery and the lower limit of an operable temperature and a heating-up end temperature.

As shown by a (shorter) dashed line in FIG. 6, in consideration of the temperature characteristics of the auxiliary battery 14, the characteristic curve of the temperature to the amount of voltage drop is estimated. The intersection point between the characteristic curve and the system operating limit line corresponds to "the lower limit of the operable temperature". "The heating-up end temperature" in step S16 (void dot in FIG. 6) is obtained by adding a margin to the lower limit. In actual processing, the internal resistance value of the auxiliary battery 14 is calculated based on the amount of voltage drop and the current values A and B, and based on the temperature characteristics of the internal resistance, the validity/invalidity is determined, and the estimated amount of voltage drop and the lower limit of the operable temperature are calculated.

In step S18, the operating state of the system (in-vehicle emergency notification device 1) is checked, and a suppliable current to the heater resistor 16 is calculated. If the suppliable current exceeds 0 A (S19: YES), the current conducted to the heater resistor 16 via the first power supply switch 17. Here, control is also performed by turning on/off the first power supply switch 17 with the PWM signal so that the current conducted to the heater resistor 16 does not exceed the suppliable current (S20).

Then, the voltage of the main battery 7 is checked (S21), and it is determined whether or not the main battery 7 has a current supply capability (S22). If the main battery 7 has the current supply capability (YES), the temperature of the auxiliary battery 14 and the temperature of the heater resistor 16 are detected (S23), and the following conditions are determined (S24):

(temperature of the auxiliary battery 14)≤(heating-up end temperature); and (temperature of the heater resistor 16)≤(overheat protection temperature).

If YES in step S24, the flow returns to step S18, and the above steps are repeated. If NO in any of the steps S19, S22, S24, the first power supply switch 17 is turned off to stop the current to the heater resistor 16 (S25). Then, the flow returns to step S14 as necessary.

On the other hand, if NO in step S17, the main power supply switch 13 is switched to the auxiliary battery 14 (S26). This processing may be controlled by hardware. Then, the same processing and determination as steps S18, S19 are performed (S27, S28). If the suppliable current exceeds 0 A (S28: YES), the current is conducted to the heater resistor 16 via the second power supply switch 18. That is, control is performed by turning on/off the second power supply switch 18 with the PWM signal so that the current conducted to the heater resistor 16 does not exceed the suppliable current (S29).

Then, the voltage of the auxiliary battery 14 is checked (S30), and it is determined whether or not the auxiliary battery 14 has a current supply capability (S31). If the auxiliary battery 14 has the current supply capability (YES), the same processing and determination as steps S23, S24 are performed (S32, S33). If YES in step S33, the flow returns to step S27, and the above steps are repeated. If NO in any of the steps S28, S31, S33, the second power supply switch 18 is turned off to stop the current to the heater resistor 16 (S34). Then, the flow returns to step S14 as necessary.

If NO in step S15 (the preheating of the auxiliary battery 14 is not necessary), the state of the main battery 7 is monitored (S35) as in step S14. If it is normal (YES), the first and second power supply switches 17, 18 are maintained off (S36). On the other hand, if it is abnormal (NO), the same processing as step S26 is performed (S37), and the flow moves to step S36.

As described above, according to the present embodiment, in the configuration to mount the auxiliary battery 14 incorporated in the in-vehicle emergency notification device 1 as the standby power supply for the main battery 7 and the heater resistor 16 for heating the auxiliary battery 14 on the printed board 11, the heat transfer mechanism 19 for transferring heat generated by the heater resistor 16 to the auxiliary battery 14 is provided. Further, the auxiliary battery 14 is detachably fixed on the printed board 11 through the heat transfer mechanism 19. Therefore, it is possible to conduct the heat generated by the heater resistor 16 to the auxiliary battery 14 through the heat transfer mechanism 19 and thereby heat the auxiliary battery 14 and to detach the auxiliary battery 14 from the heat transfer mechanism 19 as necessary for easy replacement.

Further, the heater resistor 16 is configured with a plurality of chip resistors and disposed on the front surface of the printed board 11, and the heat transfer mechanism 19 is disposed on the rear surface of the printed board 11. Further, the through hole 23 is formed at the position corresponding to the portion where the heater resistor 16 is disposed on the printed board 11 and the portion where the heat transfer member is disposed. The heat is conducted from the heater resistor 16 to the heat transfer mechanism 19 through the through hole 23.

Therefore, it is possible to compactly dispose the heater resistor 16 and the heat transfer mechanism 19 on both surfaces of the printed board 11 and also excellently maintain heat conduction efficiency by conducting the heat between the heater resistor 16 and the heat transfer mechanism 19 through the through hole 23. Further, it is possible to simply and inexpensively adjust the heating mode of the auxiliary battery 14 by adjusting the chip resistor size or the number of disposed chip resistors. In this case, since the heater resistor 16 is disposed along the longitudinal direction of the auxiliary battery 14 having the cylindrical contour, it is possible to efficiently heat the auxiliary battery 14.

Further, the heat transfer mechanism 19 is configured with the metallic battery holder 19A and the heat transfer sheet 19B. The battery holder 19A is shaped to have the fixing portion 19Ab fixed to the printed board 11 at one end and the holding portion 19Aa at the other end. The heat transfer sheet 19B is interposed between the printed board 11 and the battery holder 19A and between the battery holder 19A and the auxiliary battery 14. With this, it is possible to thermally couple the printed board 11 and the battery holder 19A while providing electrical insulation between the through hole 23 and the battery holder 19A through the heat transfer sheet 19B and to thermally couple the battery holder 19A and the auxiliary battery 14. Therefore, it is possible to efficiently conduct the heat generated by the heater resistor 16 by way of the printed board 11 the heat transfer sheet 19B and the battery holder 19A the auxiliary battery 14. Further, the heat transfer sheet 19B is used by being pressed, thereby providing the close contact of the heat transfer surface, which can excellently maintain the heat conduction efficiency, and also can absorb the backlash of the auxiliary battery 14 caused by the vibration of the vehicle, thereby preventing the occurrence of backlash sound.

Further, since the thermistor 20 for detecting the temperature of the auxiliary battery 14 is disposed close to the heat transfer mechanism 19 on the printed board 11, it is possible to detect the temperature of the auxiliary battery 14 with higher accuracy.

Second Embodiment

Figure 10:
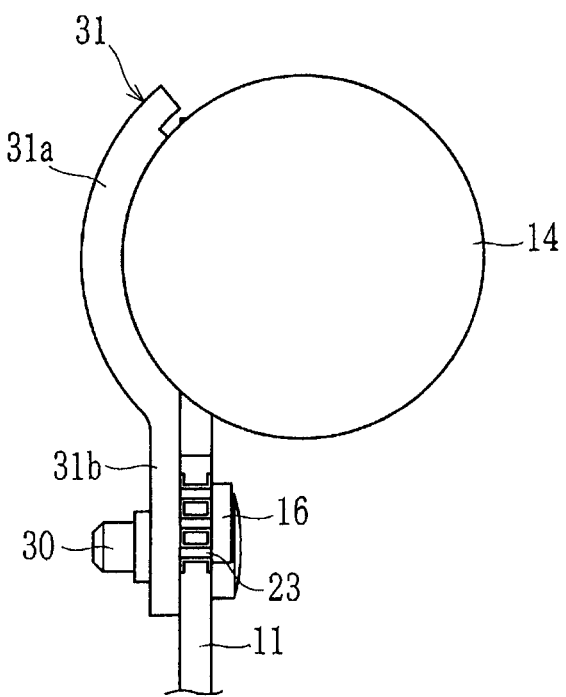
FIG. 10 is a partial enlarged view of a printed board having thereon components constituting an in-vehicle emergency notification device according to a second embodiment of the present disclosure.

Hereinafter, the same parts as in the first embodiment are denoted by the same reference numerals and will not be described, and different parts will be described. As shown in FIG. 10, in the second embodiment, a battery holder 31 (battery holder, heat transfer member) is used in place of the battery holder 19A and the heat transfer sheet 19B in the first embodiment. The battery holder 31 is made of an elastic member (e.g., heat transfer rubber, resin such as ABS, elastomer), and includes a holding portion 31a and a fixing portion 31b having shapes corresponding to the holding portion 19Aa and the fixing portion 19Ab respectively. The fixing portion 31b is directly fixed to the printed board 11 by the screw 30, and the auxiliary battery 14 is directly in contact with the holding portion 31a. When the lid of the outer case is attached, the auxiliary battery 14 is pressed from the top (in the front view) by the rear surface of the lid, and is held in the state of being pressed against the holding portion 31a.

As described above, according to the second embodiment, the battery holder 31 is composed of the elastic member, and the heat transfer member is a single body and therefore can be configured with fewer components, which can ease the fixing work to the printed board 11.

Third Embodiment

Figure 11:
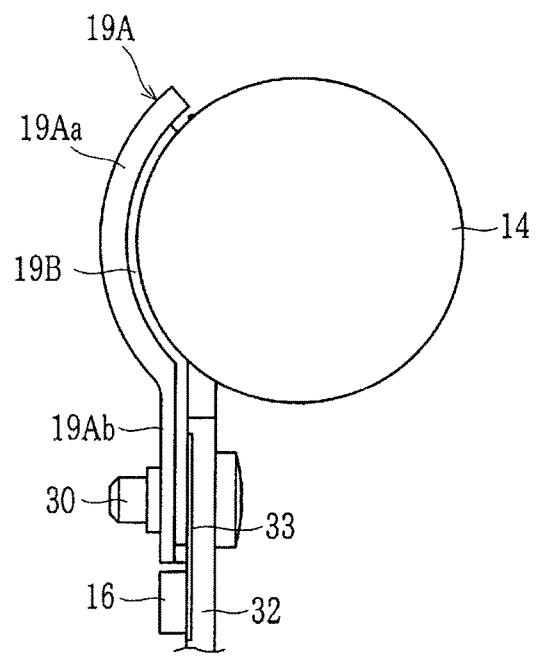
FIG. 11 is a partial enlarged view of a printed board having thereon components constituting an in-vehicle emergency notification device according to a third embodiment of the present disclosure.

In the third embodiment shown in FIG. 11, the heater resistor 16 is disposed on the rear surface of a printed board 32, and a copper foil (pattern) 33 is disposed on the rear surface where the heater resistor 16 and the fixing portion 19Ab of the battery holder 19A are disposed (the through hole 23 is not formed). Therefore, heat generated by the heater resistor 16 is conducted to the auxiliary battery 14 by way of the copper foil 33 the fixing portion 19Ab the holding portion 19Aa. With the above configuration, the third embodiment can also provide the same effect as the first embodiment.

Fourth Embodiment

Figure 12:
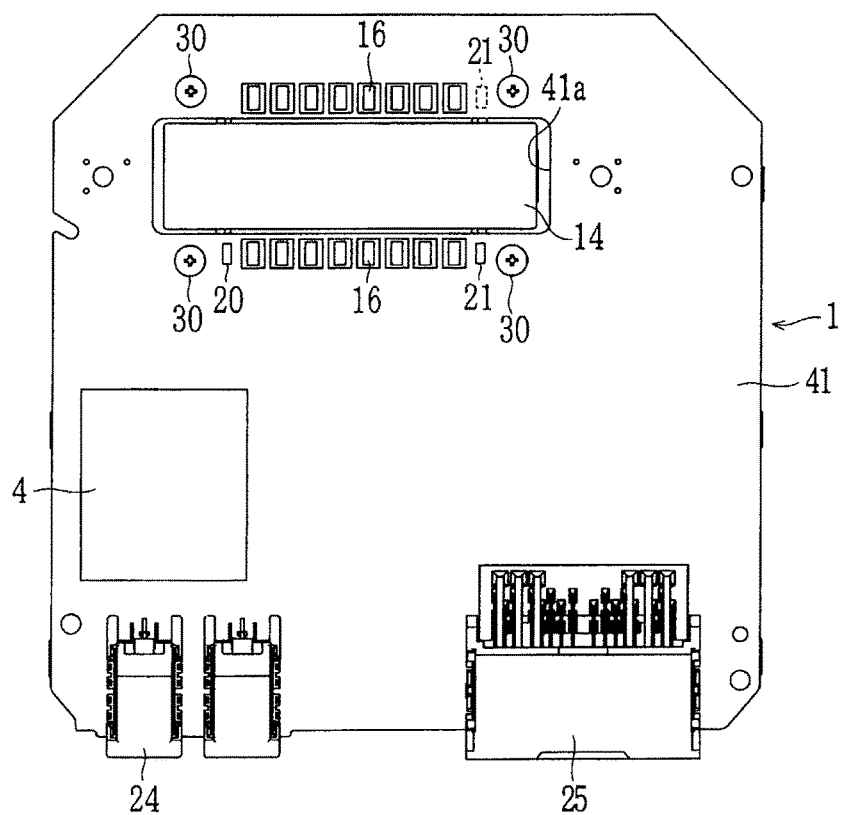
FIG. 12 is a plan view of a printed board having thereon components constituting an in-vehicle emergency notification device according to a fourth embodiment of the present disclosure.
Figure 13:
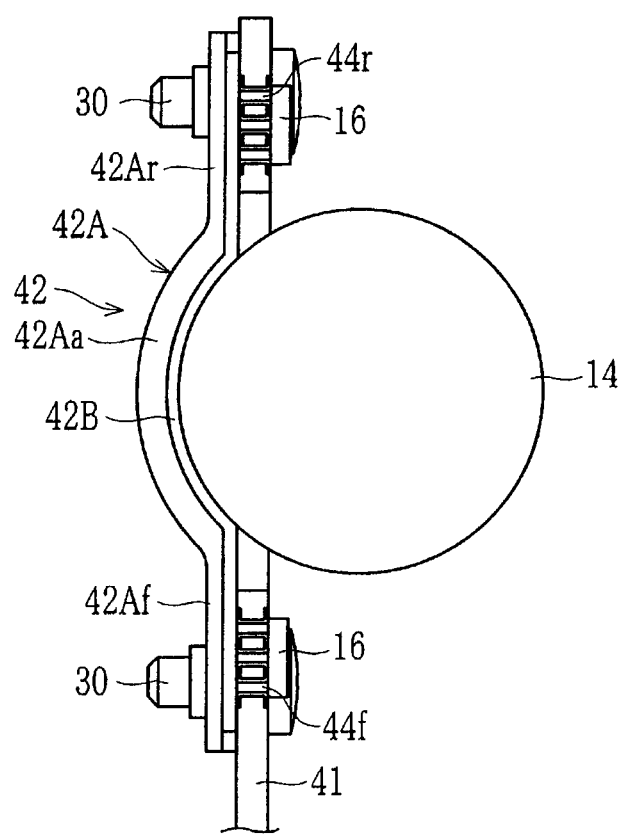
FIG. 13 is a partial enlarged view of the printed board shown in FIG. 12.
Figure 14:
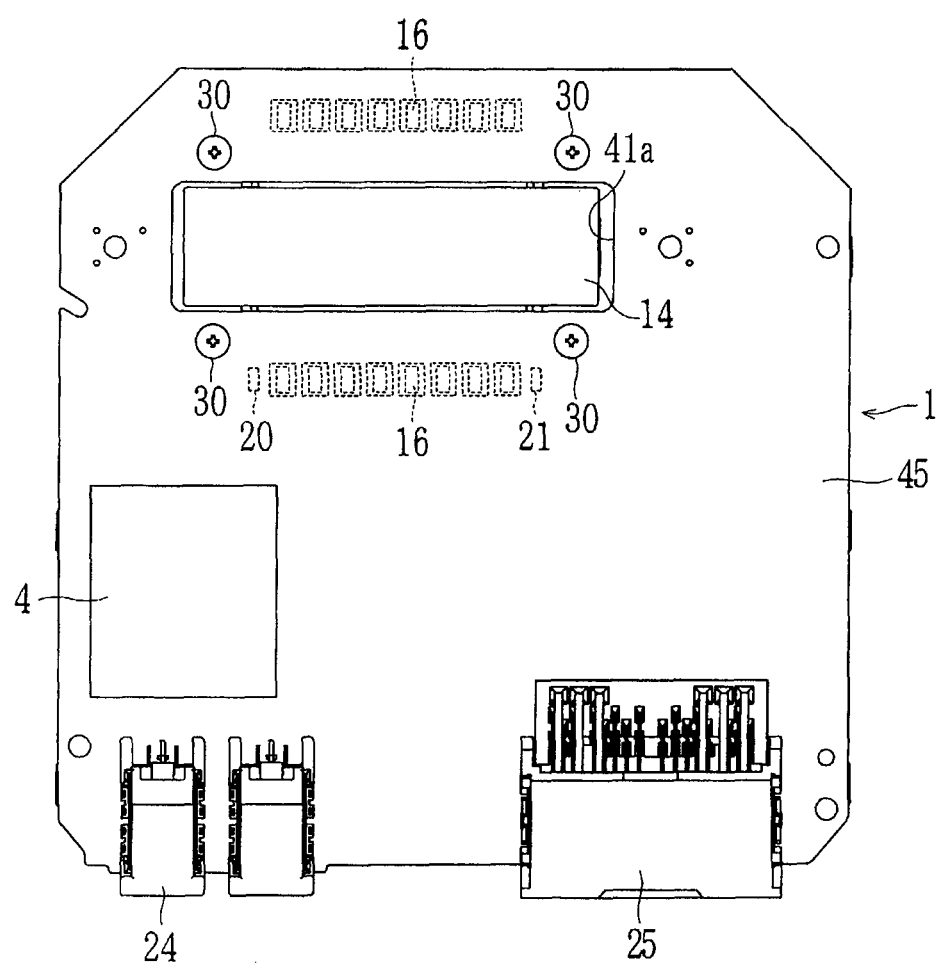
FIG. 14 is a plan view of a printed board having thereon components constituting an in-vehicle emergency notification device according to a fifth embodiment of the present disclosure.

As shown in FIG. 12, in the fourth embodiment, the shape of a printed board 41 (circuit board) differs from that of the first embodiment. That is, a rectangular opening 41a is formed in place of the cutout 11a. Further, as shown in FIG. 13, the shape of a battery holder 42A (heat transfer member, battery holder) constituting a heat transfer mechanism 42 has a front fixing portion 42Af and a back fixing portion 42Ar at a front end and a back end (a bottom end and a top end in FIG. 13) of a holding portion 42Aa having a curved surface along the contour of the auxiliary battery 14, respectively.

Further, a heat transfer sheet 42B (heat transfer member) is interposed between the battery holder 42A and the printed board 41 and between the battery holder 42A and the auxiliary battery 14, and the battery holder 42A is fixed by the screws 30 at the front fixing portion 42Af and the back fixing portion 42Ar. Further, as shown in FIG. 12, the heater resistors 16 are disposed along the longitudinal direction of the opening 41a on the front surface of the printed board 41 where the front fixing portion 42Af and the back fixing portion 42Ar are positioned. As in the first embodiment, through holes 44f, 44r are formed at locations corresponding the heater resistors 16 on the printed board 41, and heat generated by the heater resistors 16 is conducted through the through holes 44f, 44r to the front fixing portion 42Af, and the back fixing portion 42Ar on the rear surface.

As described above, according to the fourth embodiment, the battery holder 42A is fixed at both ends to the printed board 41 and configured so as to have the holding portion 42Aa between both ends, and the heater resistors 16 are disposed on both sides of the auxiliary battery 14 along the longitudinal direction thereof on the front surface of the printed board 41. Therefore, it is possible to heat the auxiliary battery 14 more efficiently.

In FIG. 12, one more thermistor 21 is shown by a dashed line. Assume that the heater resistors 16 are configured so that individual currents can flow to a group (e.g., 16F) disposed in front of the auxiliary battery 14 and a group (e.g., 16R) disposed at the back side of the auxiliary battery 14 and respective power consumptions (heating values) are set to be different. In this case, if it is necessary to detect the individual temperatures of the groups in order that the overheat protection circuit 22 performs overheat protection in a hardware manner, one more thermistor 21 is disposed as shown by the dashed line.

Fifth Embodiment

Figure 15:
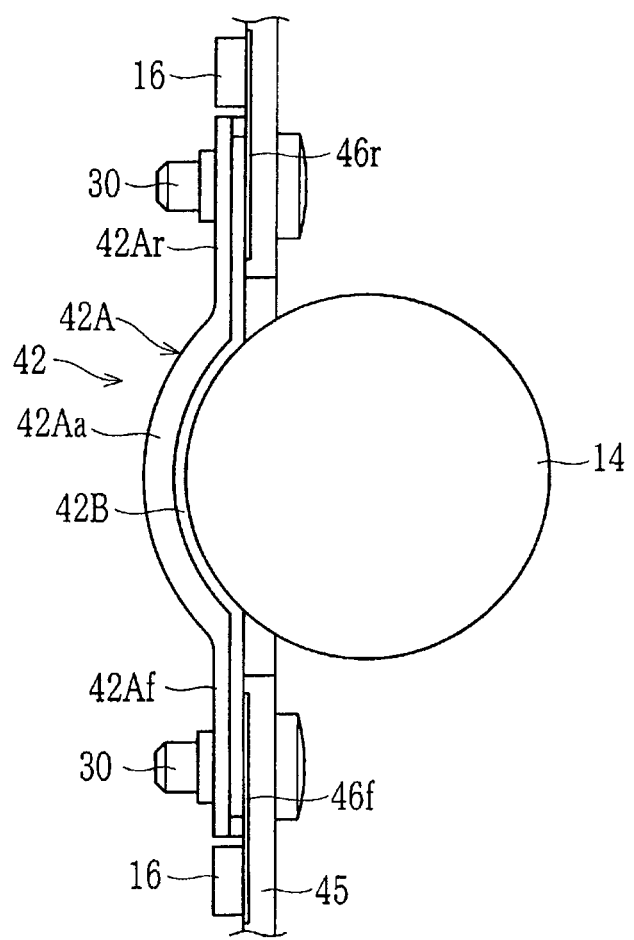
FIG. 15 is a partial enlarged view of the printed board shown in FIG. 14.

The fifth embodiment is obtained by applying the configuration of the third embodiment to the configuration of the fourth embodiment, and the contour of a printed board 45 is the same as that of the printed board 41. As shown in FIG. 15, the heater resistors 16 are disposed on the rear surface of the printed board 45. In place of the through holes 44f and 44r, copper foils 46f and 46r are disposed on the rear surface where the heater resistors 16 and the fixing portions 42Af and 42Ar of the battery holder 42A are disposed. Therefore, heat generated by the heater resistors 16 is conducted to the auxiliary battery 14 by way of the copper foils 46f, 46r the fixing portions 42Af, 42Ar the holding portion 42Aa. With the above configuration, the fifth embodiment can also provide the same effect as the third and fourth embodiments.

The present disclosure is not limited to the embodiments described above or shown in the drawings, and the following modifications or enlargements can be made.

In the first embodiment, if the temperature of the auxiliary battery 14 decreases to the operable temperature or below, the control circuit 3 does not necessarily need to check the current supply capability of the main battery 7, and current may flow to the heater resistor 16 from the auxiliary battery 14 immediately.

The heating element may be one other than the chip resistor such as the heater resistor 16.

The heat transfer sheets 19B, 42B may have a structure in which a portion in contact with the printed board 11, 32, 41, 45 is separated from a portion in contact with the auxiliary battery 14, and may be of a material of different elasticity, thickness, or the like.

The thermistor 21 and the overheat protection circuit 22 can be provided as necessary.

The holding portion of the battery holder may be cylindrical to insert the auxiliary battery therein.

In the third embodiment, three or more heater resistors 16 may be provided.

In the fourth and fifth embodiments, the heat transfer mechanism 42 may be configured with only a battery holder composed of an elastic member, as in the second embodiment.

The present disclosure may be applied to a device other than the in-vehicle emergency notification device.

While the present disclosure has been described in accordance with the above embodiments, it is understood that the present disclosure is not limited to the above embodiments and structures. The present disclosure embraces various changes and modifications within the range of equivalency. In addition, various combinations and modifications and other combinations and modifications including only one element or more or less than one element are within the scope and sprit of the present disclosure.

What is claimed is:

1. A circuit board structure comprising:
a circuit board;
a battery that is detachably fixed on the circuit board;
a heating element that is disposed on the circuit board, and generates heat when a current flows to the heating element from a power supply; and
a heat transfer member that is disposed adjacent to the heating element, and transfers the heat generated by the heating element to the battery, wherein
the battery is detachably fixed on the circuit board through the heat transfer member,
the circuit board has a cutout,
the heat transfer member has:
a metallic battery holder that includes a fixing portion defining an end fixed to the circuit board, and a battery holding portion extending from the fixing portion toward the cutout and having a shape for holding the battery in the cutout; and
a heat transfer material that has an elasticity and a sheet shape, and is interposed between the circuit board and the fixing portion of the battery holder and between the battery holding portion of the battery holder and the battery.

2. The circuit board structure according to claim 1, wherein
the heating element is disposed on one surface of the circuit board,
the heat transfer member is disposed on another surface of the circuit board, and
the circuit board is formed with a through hole at a position corresponding to a portion where the heating element is disposed and a portion where the heat transfer member is disposed, and the heat is conducted from the heating element to the heat transfer member through the through hole.

3. The circuit board structure according to claim 1, wherein
the heating element includes a chip resistor.

4. The circuit board structure according to claim 1, wherein
the battery has a cylindrical shape, and
the heating element is disposed along a longitudinal direction of a contour of the battery.

5. The circuit board structure according to claim 4, wherein
a plurality of the heating elements are disposed on both sides of the battery along the longitudinal direction of the contour of the battery.

6. The circuit board structure according to claim 1, further comprising
a temperature detection unit that detects a temperature of the battery,
wherein the temperature detection unit is disposed close to the heat transfer member on the circuit board.

7. The circuit board structure according to claim 1, wherein
the cutout is recessed from an end of the circuit board,
the end of the fixing portion is fixed along a rim of the circuit board, the rim defining the cutout.

8. The circuit board structure according to claim 1, wherein
the fixing portion is disposed along a surface of the circuit board through the heat transfer material, and
the battery holding portion extending from the fixing portion has a curved plate shape along a contour of the battery.

9. The circuit board structure according to claim 8, wherein
a plurality of the heating elements is disposed along a rim of the circuit board defining the cutout, on another surface of the circuit board, the another surface being opposite to the surface along which the fixing portion is disposed through the heat transfer material, and
the circuit board is formed with a plurality of through holes at positions corresponding to the heating elements, and the heat is conducted from the heating element to the heat transfer member through the through holes.

* * * * *